United States Patent
Elmasry et al.

(10) Patent No.: US 7,738,372 B2
(45) Date of Patent: *Jun. 15, 2010

(54) METHOD AND SYSTEM FOR CAPACITY ANALYSIS FOR ON THE MOVE ADHOC WIRELESS PACKET-SWITCHED NETWORKS

(75) Inventors: George F. Elmasry, North Attelboro, MA (US); C. John McCann, Needham, MA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/240,745

(22) Filed: Sep. 29, 2008

(65) Prior Publication Data

US 2009/0028064 A1 Jan. 29, 2009

Related U.S. Application Data

(63) Continuation of application No. 11/071,227, filed on Mar. 4, 2005, now Pat. No. 7,561,514.

(60) Provisional application No. 60/550,374, filed on Mar. 5, 2004.

(51) Int. Cl.
*H04L 12/26* (2006.01)
(52) U.S. Cl. .................. 370/231; 370/395.21
(58) Field of Classification Search .............. None
See application file for complete search history.

(56) References Cited

U.S. PATENT DOCUMENTS

| | | | |
|---|---|---|---|
| 5,253,161 A | 10/1993 | Nemirovsky et al. | |
| 7,068,600 B2 | 6/2006 | Cain | |
| 7,177,652 B1 | 2/2007 | Hopper et al. | |
| 2002/0133584 A1 | 9/2002 | Greuel et al. | |
| 2004/0022224 A1 | 2/2004 | Billhartz | |
| 2004/0032847 A1 | 2/2004 | Cain | |
| 2005/0030952 A1 | 2/2005 | Elmasry et al. | |

FOREIGN PATENT DOCUMENTS

EP  1271844 A3  2/2004

OTHER PUBLICATIONS

Ford, Juanita C., et al., "Proactive Network Design," IEEE, 1999, pp. 113-130.
Elmasry, George et al., "Bottleneck Discovery in Large-Scale Networks Based on the Expected Value of Per-hop Delay," Proceedings of Milcom 2003, Boston, Mass., Oct. 13-16, 2003; IEEE, 2003, pp. 403-410.

*Primary Examiner*—Chirag G Shah
*Assistant Examiner*—Otis L Thompson, Jr.
(74) *Attorney, Agent, or Firm*—Ingrassia Fisher & Lorenz, P.C.

(57) ABSTRACT

A system and method for capacity analysis in communication networks, particularly for on the move ad hoc wireless packet-switched networks, as well as wide variety of other multimedia networks is disclosed. The invention seeks to use the same two attributes per link (link capacity and link utilization) as known circuit-switched based analysis tools while incorporating useful aspects of various statistical analyses, such as a Queuing Theory based analysis, among others. In one embodiment, the invention introduces four tests to be implemented per each link, with results of these four tests being used to color code link congestion states to generate the reports for a planner. These four tests may generate an improved analysis of the network utilizing the same number of variables used in simple conventional circuit switched based analysis.

18 Claims, 3 Drawing Sheets

METHOD AND SYSTEM FOR CAPACITY ANALYSIS FOR ON THE MOVE ADHOC WIRELESS PACKET-SWITCHED NETWORKS

CROSS-REFERENCES TO RELATED APPLICATIONS

This is a continuation of U.S. application Ser. No. 11/071,227, filed Mar. 4, 2005, which claims the benefit of U.S. Application Ser. No. 60/550,374, filed Mar. 5, 2004; both applications are incorporated herein by reference.

FIELD OF THE INVENTION

The invention relates generally to capacity analysis and planning in communication networks. More particularly, the invention relates to capacity analysis based on such factors as link effective bandwidth and link utilization. Even more particularly, the invention may be applied to On The Move (OTM) ad-hoc wireless packet-switched networks and/or multimedia wireless ad-hoc OTM networks (e.g. future tactical networks).

BACKGROUND

By way of background, OTM ad-hoc packet-switched wireless network (e.g. future tactical network) links carry different types of multiplexed packets (voice, video and data). This raises the desire to have capacity analysis and planning tools that supplant circuit-switched based planning tools. Packet switched capacity analysis tools may consider the statistically multiplexed heterogeneous traffic using the network and at the same time may perform simple computations to allow a planner to simulate long runs (scenarios) for very large networks (thousands of nodes) considering all the stages and formation of the OTM network in a very short time.

Typical circuit-switched based capacity analysis tools utilize two attributes per link (link capacity and link utilization). Link capacity is the actual trunk size, while link utilization is the reserved bandwidth over the link. Certain known systems rely only on a characteristic denoted "headroom," i.e., a difference between maximum capacity and current traffic. As the link utilization approaches the link capacity (with allocating more calls/sessions over the link), circuit switch based tools indicate link congestion level and reports are generated to the planner. For example, on a Graphical User Interface (GUI) or other such tool accessible by the planner, color or another designator may be used to indicate the congestion or other factors of interest to the planner. Such systems have been found to be insufficient in certain circumstances.

With packet-switched networks, the situation differs due to the nature of statistically multiplexed heterogeneous traffic. On one hand, standard Queuing Theory analysis produces complex mathematical formulas that use knowledge of many factors like packet size, traffic shape, router scheduling, etc. Many of these parameters may not be available to the planner. On the other hand, following circuit switched based analysis may tend to produce inaccurate results. What is needed is a system for providing more reliable results. In one embodiment, it is desired that these results be achieved despite maintaining a certain simplicity of known systems in that only traffic and capacity be received as inputs.

SUMMARY OF THE INVENTION

A system and method of the invention seek to analyze planned networks in a dynamic, robust and accurate manner. While the invention may be useful for the art of capacity analysis and planning for wireless ad-hoc OTM networks, and will at times be described with specific reference thereto, it should be noted that the invention is also applicable to other fields and applications. For example, the invention may be used in a variety of environments that analyze wired or wireless links, including cellular, satellite, etc., and including a wide variety of other multimedia networks. The results of this analysis can also be used for applications including, but not limited to, Call Admission Control (CAC), topology management and gauging QoS (Quality of Service). Further description relating to QoS within a packet switched network can be found in co-pending U.S. patent application Ser. No. 10/813,603, filed Mar. 31, 2004 and entitled Call Admission Control/Session Management Based On N Source To Destination Severity Levels For IP Networks. That application, which describes using a combined call admission control/session management (CAC/SM) algorithm, is hereby incorporated herein by reference in its entirety.

The present invention introduces a new method and system for capacity analysis, such as for OTM ad-hoc wireless networks, and seeks to use the same two attributes per link (link capacity and link utilization) as known circuit-switched based analysis tools while incorporating useful aspects of various statistical analyses, such as a Queuing Theory based analysis, among others.

In one embodiment, the invention introduces four tests to be implemented per each link, with results of these four tests being used to color code link congestion states to generate the necessary reports for the planner. These four tests may generate an improved analysis of the network utilizing the same number of variables used in simple conventional circuit switched based analysis. The simplicity of the analysis may make possible a tool that allows the planner to do multiple simulations and/or to answer "what if" questions by running full scenarios in less time. Exemplary values and thresholds for such tests, as well as observed examples and results, are provided below.

Further details and exemplary implementations are provided below in a detailed description of embodiments of the invention.

BRIEF DESCRIPTION OF THE DRAWINGS

Additional features and advantages of the present invention will become more fully apparent from a review of the following detailed description of embodiments of the invention, along with the accompanying drawings, in which.

DETAILED DESCRIPTION

The present invention offers a capacity analysis tool for a planner that may perform sampling of network traffic at snapshot times (each snapshot may have a different formation of the wireless ad-hoc OTM network). To perform this sampling, the tool may use knowledge of the aggregate traffic load (from any or all classes of services) at the snapshot time between each active source and destination node in the network. Such characteristics are commonly measured in bits-per-second (bps), although other methodologies may be used as well. In one embodiment, traffic load is extracted from information known about the relevant system. For example, Information Exchange Requirements (IERs) might be utilized. IERs provide a description and/or outline requirements for the exchange of information. Often, these requirements are given as a set of characteristics, such as source and destination, size, speed and content, and may also include aspects of security or others. IERs may or may not be dependent on a communication used. Knowing the path between a source and destination (given the network topology at the snapshot time), the tool is able to accumulate the traffic over each link in the path. By considering all the communication activities of the IERs at the snapshot time, the tool can determine the traffic in bps over each link in the planned network at each snapshot time.

Many implementations for the present invention are contemplated. In one embodiment, the invention is applied in a military context, such as by a NetOps (Network Operations) planner. In advance of an anticipated military operation, such a planner may reference a color-coded network chart or display (as noted above), and run scenarios or simulations using varying factors. For example, a planner may vary link/network capacities, topologies, etc., to determine an optimal arrangement for a given operation. The invention may be used to generate an indication of link and/or network health, such as a health score. Examples of this are provided below. In this way or others, the invention may also be useful in generating a network management policy.

The invention is able to use the knowledge of this bps and the size of each link in the planned network. Note that these two parameters (bps and link size) are the same parameters commonly used to plan a circuit switched network. Also note that for OTM ad-hoc networks the size of a radio link may vary based on the location of the two ends of the link, terrain, and characteristics of the radio links. The term effective bandwidth is used herein to refer to the effective link size at a given snapshot time.

Figure 1:
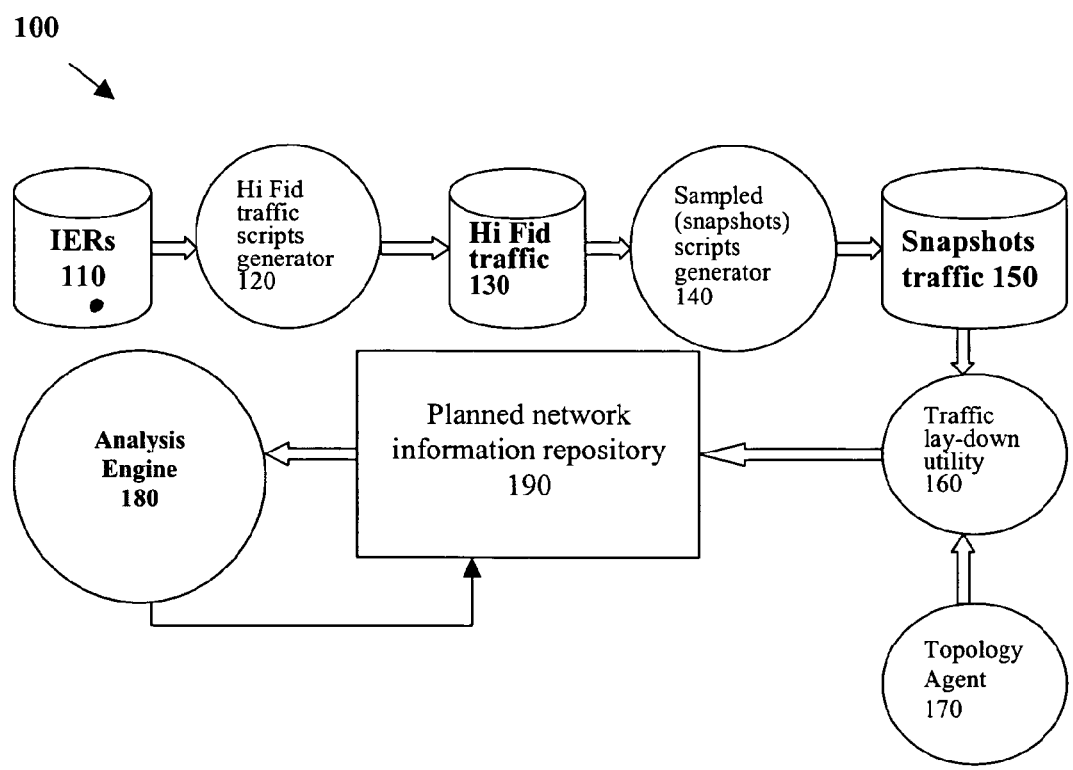
FIG. 1 is a flow diagram showing the sequence of events used by the capacity analysis tool indicating where the algorithm is utilized in accordance with an embodiment of the invention.

FIG. 1 depicts a flow diagram 100 showing the sequence of events used by the capacity analysis tool or engine 180 indicating where and/or how the algorithm is utilized in accordance with an embodiment of the present invention. For purposes of illustration, it is assumed that this embodiment relates to a planned battlefield theatre. Item 110 in FIG. 1 represents IERs for the planned battlefield theatre. The IERs in this case are the expected pattern of information flow between the network nodes (e.g., operational needs). The IERs are fed to a utility program 120 that produces high fidelity traffic scripts 130. These high fidelity traffic scripts 130 give detailed information about each call (start time, length, rate, precedence, etc.). Regarding precedence, certain traffic may, for example, be considered low-precedence, high-precedence or otherwise due to such factors as a status (e.g., rank), location or other characteristic of a transmitter or sender, an urgency of the message, etc. The high fidelity traffic scripts are then passed through a utility 140 that samples the traffic during the period of the planned maneuver time to generate snapshots of traffic 150. That is, it produces the data rate going between a source and a destination at a given sampling time, among other parameters. A topology agent 170 provides information about a topology of a network to a traffic lay-down utility 160. The traffic lay-down utility 160 provides this information, as well as information provided in the snapshots traffic 150, to a planned network information repository 190. This repository 190, as noted below, may include such information as a description of nodes, links and/or traffic of a network. In one embodiment, this information is maintained dynamically, changing in real-time with changes in traffic and network features.

For illustrative purposes, a behavior of the analysis tool 180 in one such an embodiment of the invention will now be summarized in the following algorithm format:

1: A traffic lay-down utility 160 opens each traffic demand (which is defined as the transfer data rate between a source and destination) at the given sampling time.

2: For the given topology at the sampling time (which is obtained from a topology agent 170) find the path traffic will take (using whichever algorithm(s) or technique(s) a relevant router uses, e.g., shortest path finder SPF).

3: Lay down (e.g., receive, apply) the traffic demand over each link in the found path. For each link accumulate the traffic from all traffic demands that will use the link. Update the planned network information repository with the accumulated traffic demand for each link.

4: Go to 1 if there are more traffic demand records at the given sampling time.

5: If we are done with all the records at the given sampling time, then the planned network information repository is ready for the analysis engine 180.

6: The analysis engine 180 does the following:

a—Finds the accumulated traffic over each link.

b—Finds the link capacity (maximum bps that can go over the link).

c—Apply tests 1, 2, 3, and 4 and update a planned network information repository 190 with test results. Such a repository might include link information including, but not limited to, link size, utilization, health, etc.

d—Find each link's overall health and update planned network information repository with link health results.

The link overall health may be reported to the topology agent 170, which may use it to modify the topology for next snapshot time.

7: At the next sampling time go to 1.

8: If done with all sampling time (i.e., scenario is complete), analyze the collected information to generate a report about the planned scenario given the test results from 6-c and 6-d.

Any or all of the items illustrated in FIG. 1 may be embodied in a variety of ways. In one embodiment, IERs 100, hi-fidelity traffic 130 and snapshots 150 represent data streams or data structures from any of a variety of sources, as discussed above. Utilities 120, 140 and 160 topology agent 170, analysis engine 180 and/or repository 190 may be implemented and supported on any of a variety of devices, such as on a mainframe or by a stand-alone or networked processor. Databases or other record structures may be incorporated as well. For example, repository 190 may be any suitable storage device or space, including one or more tables, collections of data structures, databases, etc.

In a packet switched network, an approximation of queuing behavior (known as M/M/1 queuing) may be defined as:

$$E[T]=1/(\mu-\lambda) \tag{1}$$

This means that the expected value of delay, E[T] (e.g., queuing and transmission delay) of a packet is dependent upon a packet service rate $\mu$ and a packet arrival rate $\lambda$. See e.g., Alberto Leon-Garcia, *Probability and Random Processes for Electrical Engineering*, Second Edition, Addison-Wesley, 1994; and Dimitri Bertsekas and Robert Gallager, *Data Networks*, Second Edition, Prentice Hall, 1994; each of which is hereby incorporated by reference in its entirety. Of course, the precise queuing behavior is very complex and dependent upon many parameters. Such parameters include the exact size of the packets of each class of service, the exact service rate, the arrival rate of each class of service, etc. Depending on a desired implementation, acceptable cost and/or complexity, among other factors, such parameters and/or other may or may not be considered in implementing a planning tool.

In previous work by the Applicants, making the service rate μ correspond to link size and making the link usage (bps) correspond to arrival rate was studied. George Elmasry and C. John McCann, "Bottleneck Discovery in Large-Scale Networks Based on the Expected Value of Per-hop Delay," *Proceedings of Milcom* 2003, Boston, Mass., Oct. 13-16, 2003, hereby incorporated by reference in its entirety. Among other observations, it has been noted that:

Assuming that μ corresponds to the link size may be valid, particularly in dealing with a wireless network having tight bandwidth, where the service rate over a link is bounded by link capacity.

Using aggregate bps as λ excludes dropped traffic (e.g., traffic shaping, etc., performed by routers or other equipment need not be considered).

The above M/M/1 based formula is per packet. The assumption of considering it per bit is equivalent to assuming that all packets have the same size.

Even when such assumptions and/or approximations are made, however, it has been found that a fairly strong correlation exists between the actual measured network queuing delay and the estimated E[T], where service rate μ corresponds to the link size and link usage (bps) corresponds to arrival rate. In one embodiment, certain concepts in accordance with the present invention exploit this correlation to generate a robust analysis tool for capacity planning.

Equation (1) above can be expressed as follows:

$$E[T_i] = \frac{1}{\mu - \lambda} = \frac{1}{\mu} * \frac{1}{1 - \lambda/\mu}. \quad (2)$$

Considering the right hand side of the equation, which has two parts $$\frac{1}{\mu} \text{ and } \frac{1}{1 - \lambda/\mu},$$

the first part shows that as the link size μ increases, the term $$\frac{1}{\mu}$$

decreases, which decreases the expected value of delay E[T]. In other words, one can expect that as the link size increases, the link is likely to cause less congestion. The second part states that as the link percent utilization λ/μ increases, the term $$\frac{1}{1 - \lambda/\mu}$$

increases, which increases the expected value of delay E[T]. In other words, one can expect that as the link percent utilization increases, the link is likely to cause more congestion. Thus, one can expect link contribution to an occurred congestion to be defined by both the link size and the link utilization. As mentioned above, the invention enables a robust analysis by passing each link through four separate tests based on the above formula.

Figure 2:
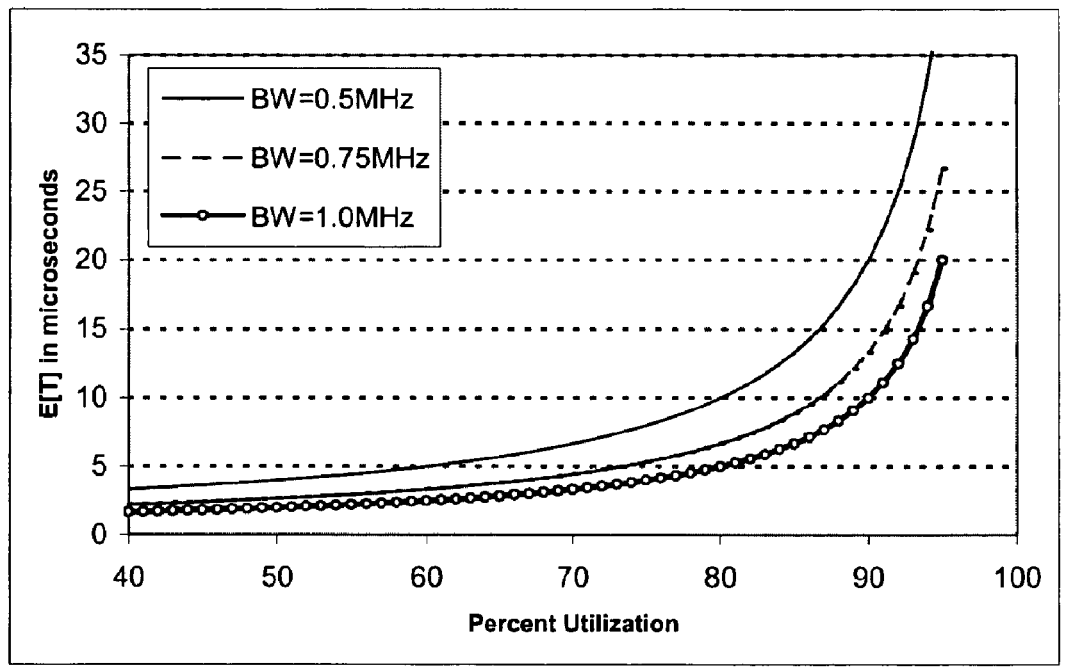
FIG. 2 shows a plot of the expected value of link delay versus percent link utilization for three sizes of links in accordance with an embodiment of the present invention.

Certain of these concepts are illustrated by way of example in FIG. 2, which shows a plot of the expected value of delay versus percent utilization using formula (1) for three sizes of links, i.e., 0.5 MHz, 0.75 MHz and 1.0 MHz bandwidth (BW). By considering the horizontal dotted line that crosses the vertical axes at 5, one can predict that a 0.5 MHz link utilized at 60% will experience a comparable delay to that experienced as a 1.0 MHz link utilized at 80%.

In one embodiment of the invention, 4 tests are applied to each link based on formula (1) and the above explanation. In one such embodiment, the four tests are:

1—Expected Value of Delay Thresholds

This test defines links where the expected value of delay exceeds an upper bound threshold $T_U$ (indicating over-utilization), links where the expected value of delay is less than a lower bound $T_L$ (indicating underutilization), and links in between (neither over-utilized nor underutilized). See FIG. 3, described in greater detail below.

2—First Derivative

This test identifies links where the rate of change (slope) of the curve shown in FIG. 2 is high, links where the slope of the curve in FIG. 2 is low, or links with slopes in an intermediate range.

3—Second Derivative

This test identifies links where the acceleration of expected value of delay, shown in FIG. 2, is high, links where the acceleration of the curve in FIG. 2 is low, or links where the acceleration is within the proper range.

4—Standard Deviation

This test will analyze the expected value of delay per link in relationship to all the other links in the network. The test is used to determine whether the selected network topology deviates from or gets closer to optimality. In other words, if the OTM ad-hoc network (or other network of interest) generates a topology such that high rate radios are assigned to high rate links and low rate radios are assigned to low rate links, the standard deviation of the expected value of delay between all links will be low. On the other hand, if the network selected topology such that low rate radios are assigned to high rate links and high rate radios are assigned to low rate links, the standard deviation of the expected value of delay between all links will be comparatively high.

Test 1: Expected Value of Delay Threshold

One can anticipate that if the expected value of delay of a given link exceeds a certain threshold, the link can be considered congested. For example, the link may be congested in the sense that any pair of nodes communicating over it are likely to suffer from some level of QoS degradation. The challenge is to find this threshold, which may depend on factors such as the nature of traffic. Certain issues to consider might include: whether the link carries mostly time-sensitive or non-time-sensitive traffic; how the traffic will be shaped; what is the behavior of the scheduler serving the queues, etc. One basis for the estimation is through the use of any of a variety of network modeling and/or simulation tools, such as those offered by OPNET® Technologies, Inc., Bethesda, Md.

Figure 3:
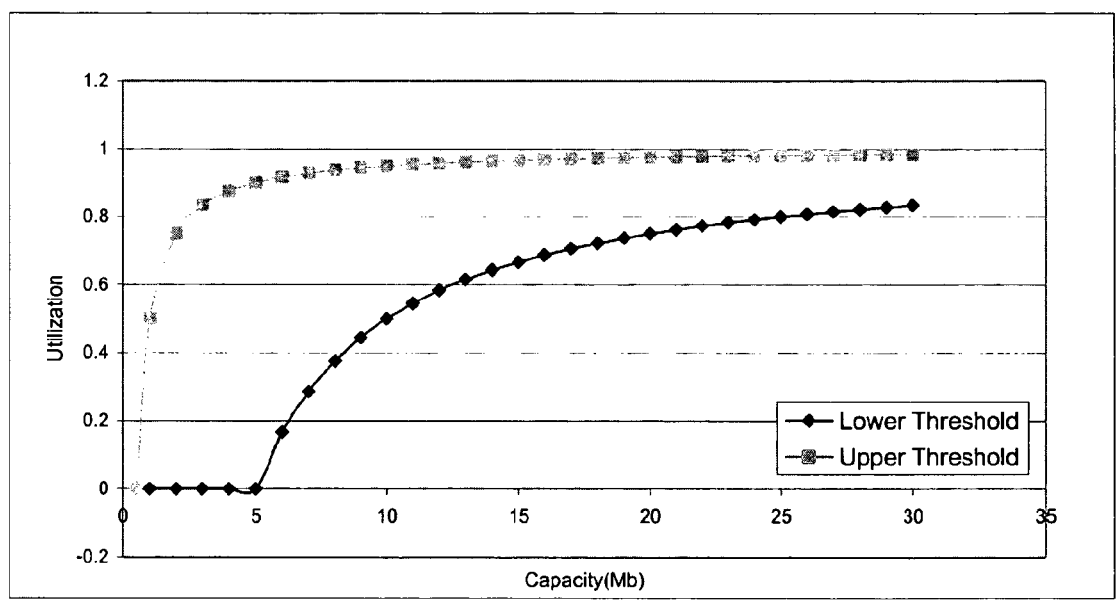
FIG. 3 shows a plot of percent utilization versus link capacity, with an expected value of delay upper-bounded by $T_U=2$ microseconds per bit and lower-bounded by $T_L=0.2$ microseconds per bit in accordance with an embodiment of the present invention

The curve in FIG. 3 shows a plot of percent utilization versus link capacity, where the expected value of delay is upper-bounded by $T_U$=2 microseconds per bit and lower-bounded by $T_L$=0.2 microseconds per bit. The area between the two curves defines the range of acceptable utilization of the link as a function of link capacity in this embodiment of the invention. The area above the $T_U$ curve reflects over-utilized links and the area under the $T_L$ curve reflects under-utilized links. In such an embodiment, it is observed that if a link size is small, the link can cause congestion with relatively low utilization. If a link size is large, any fluctuation in the percent utilization of the link can move the link from the under-utilized area to the over-utilized area.

Test 2: First Derivative

As mentioned above, in one embodiment, this test addresses, in FIG. 2, links where the slope of the curve shown is high, links where the slope of the curve is low, or links within the proper range of utilization. This test attempts to anticipate possible congestion from any slight increase in rate of change of E[T] versus link utilization.

For example, if r is set to be equal to percent utilization, i.e., $r=100*\lambda/\mu$ and d(r) represents the expected value of delay in microbits per second, Equation (2) above becomes $$d(r) = \frac{10^6}{\mu - \lambda} = \frac{10^6}{\mu} * \frac{1}{1 - \lambda/\mu},$$

and substituting in r becomes $d(r)=10^6/\mu(1-r/100)$.

Factoring out 1/100 from the denominator yields $d(r)=10^8/\mu(100-r)$, with the first derivative being represented by $$d^1(r)=10^8/\mu(100-r)^2 \qquad (3)$$

Equation (3) can be used to map each link to a range of the first derivative based on link capacity and percent utilization.

Test 3: Second Derivative

The concavity of the curve in FIG. 2 obtained through the second derivative adds information to that obtained from the first derivative. Starting from Equation (3), the second derivative can be obtained as $$d^{11}(r)=2*10^8/[\mu(100-r)^3] \qquad (4)$$

Equation (4) can be used to map each link to a range of second derivatives based on link capacity and percent utilization.

Test 4: Standard Deviation

As mentioned above, in one embodiment, this test analyzes the expected value of delay per link relative to all the other links in the network.

The sum of expected values of delay of all links can be obtained as follows:

$$E[T_{sum}] = \sum_{i=1}^{n} E[T_i], \qquad (5)$$

where n is the total number of links in the network under analysis.

Based on Equations (2) and (5), a cost function $C_i$ for a link i can be obtained as follows:

$$C_i = \frac{E[T_i]}{E[T_{sum}]} * 100. \qquad (6)$$

$C_i$ then reflects the contribution of link i to the overall expected value of delay.

The above analysis can be further appreciated by first focusing on the link with the highest cost function, in terms of contribution to delay. It is first assumed that the n cost functions of all n links are scanned, and that $C_j$ has the highest value; that is, $C_j$ is the highest in $\{C_1, C_2, \ldots, C_i, \ldots C_n\}$. This also implies that $C_j$ is higher than the average cost, i.e., $$C_j*n \geq 100 \qquad (7)$$

If the OTM ad-hoc network or other pertinent network is given enough resources (spectrum, UAVs, radio interfaces per node, relays, etc.) and the network topology is selected properly (e.g., high capacity frequencies are given to high rate links, low capacity frequencies are given to low rate links, the number of links for high rate communicating pairs is minimized, etc.), the standard deviation between the cost function of all the links should be desirably minimized. This can be indicated in Equation (7) by making $C_j*n$ a minimal, and potentially predetermined, percentage above 100.

On the other hand, if the OTM ad-hoc network is not given enough resources, or the network topology is not selected properly, the standard deviation between the cost functions of all the links is expected to be higher. This can be indicated in Equation (5) by making $C_j*n$ a comparably greater percentage above 100. This can be expressed as follows:

$$C_j*n \geq 100+\Delta, \qquad (8)$$

where $\Delta>0$, and $\Delta$ increases as the topology deviates from optimality and decreases as the topology approaches optimality.

In one embodiment, a discriminating value for $\Delta$ is determined as follows. It is assumed that the expected values of delay are normally distributed. To mitigate the impact of large outlier values, the median may be a more robust measure of central tendency than the mean. Sorting the $E[T_i]$ by value, letting m be the median value of the $E[T_i]$, and letting M be the n/3 value above the median, it can be observed that approximately ⅔ of the values will be within plus or minus one standard deviation of the mean. Thus, M−m would be approximately s, where s is an estimate of the standard deviation of the expected values of delay. Consequently, $\Delta$ is just s translated into cost terms, i.e., in terms of a contribution to delay:

$$\Delta = \frac{s*100*n}{E[T_{ete}]}. \qquad (9)$$

This test can be used as follows:

Rank all links to a group of links with cost functions exceeding the mean plus twice the standard deviation, a group of links with cost functions less than the mean minus twice the standard deviation, and a group of links with cost functions within the twice standard deviation.

The value of $\Delta$ can be used to indicate how the topology formation of the OTM ad-hoc network converges or diverges from optimality.

To illustrate further, an example is now provided. The following tables show exemplary threshold values and corresponding test scores that may be established in an embodiment of the invention for the tests described above:

| Expected Value: | | |
|---|---|---|
| Score | Lower Threshold | Upper Threshold |
| 1 | 0.0 | 0.0 |
| 2 | 0.0000002 | 0.0000002 |
| 3 | 0.000002 | 0.000002 |
| 4 | 0.000003 | 0.000003 |
| 5 | 0.000004 | 0.000004 |
| 6 | Lambda >= mu ($\lambda >= \mu$) | 0.0005 |

| First Derivative: | | |
|---|---|---|
| Score | Lower Threshold | Upper Threshold |
| 1 | 0.0 | 1.0 |
| 2 | 1.0 | 28.6 |
| 3 | 28.6 | 57.3 |
| 4 | 57.3 | 95.5 |
| 5 | 95.5 | 573.0 |
| 6 | 573.0 | 1146.0 |

| Second Derivative: | | |
|---|---|---|
| Score | Lower Threshold | Upper Threshold |
| 1 | 0.0 | 0.0005 |
| 2 | 0.0005 | 0.02 |
| 3 | 0.02 | 0.03 |
| 4 | 0.03 | 0.1 |
| 5 | 0.1 | 0.5 |
| 6 | Lambda >= mu ($\lambda >= \mu$) | |

Test Scores: As shown, for each of the four tests, lower and upper thresholds are established for 5 gradations of values, while a $6^{th}$ state is reserved for an impossible request. In one embodiment, each stage is assigned a numerical value, indicating a health score, having one of the following meanings:

1: very underutilized

2: underutilized

3: good

4: slightly over utilized

5: highly over utilized

6: impossible

In an implementation in which four tests are implemented, each yields a numerical value and the state of a link is assigned a final score. In one embodiment, the final score is an average of the scores for the four tests, although other possibilities are contemplated. The final score reflects the link overall health and may be used to produce reports for the planner, color code the link in a GUI showing the planned network state, among other uses.

Yet additional examples are now provided that include observed numerical data for different link sizes and different link utilization. The score of each test and the corresponding overall link health is shown. These values were obtained from log files used with a capacity analysis tool built using the above algorithm in accordance with the present invention.

EXAMPLE 1

| Planned Rate is Higher than Planned Link BW | |
|---|---|
| Effective BW (mu): | 6109337.279102559 |
| Data Rate (lambda): | 6244983.906602561 |
| SEVERE CONGESTION | |
| Overall Health | 6 |

EXAMPLE 2

| Slightly Underutilized Small Link | |
|---|---|
| Effective BW (mu): | 1250000.0 |
| Data Rate (lambda): | 346901.51 |
| E[T] | 1.107298939233084E-6 |
| Delay Rating | 2 |
| Delay trend Rating | 1 |
| Delay Acceleration | 3 |
| Two Sigma | 3 |
| Overall Health | 2 |

EXAMPLE 3

| Over-Utilized Medium Size Link | |
|---|---|
| Effective BW (mu) | 4547398.458333332 |
| Data Rate (lambda) | 4394263.991666664 |
| E[T] | 6.5302085269721105E-6 |
| Delay Rating | 5.0 |
| Delay trend Rating | 5 |
| Delay Acceleration | 5 |
| Two Sigma | 5 |
| Overall Health | 5 |

EXAMPLE 4

| Well-Balanced Small Link | |
|---|---|
| Effective BW (mu): | 1250000.0 |
| Data Rate (lambda): | 433072.897115 |
| E[T] | 1.2240994287849479E-6 |
| Delay Rating | 2.0 |
| Delay trend Rating | 1 |
| Delay Acceleration | 3 |
| Two Sigma | 5 |
| Overall Health | 3 |

EXAMPLE 5

| Underutilized Large Link | |
|---|---|
| Effective BW (mu): | 1.07E7 |
| Data Rate (lambda): | 8703322.215 |
| E[T] | 5.008319357596409E−7 |
| Delay Rating | 2.0 |
| Delay trend Rating | 1 |
| Delay Acceleration | 3 |
| Two Sigma | 3 |
| Overall Health | 2 |

EXAMPLE 6

| Slightly Over-Utilized Large Link | |
|---|---|
| Effective BW (mu): | 1.08E7 |
| Data Rate (lambda): | 9448544.45320513 |
| E[T] | 7.399429469741811E−7 |
| Delay Rating | 2.0 |
| Delay trend Rating | 5 |
| Delay Acceleration | 4 |
| Two Sigma | 3 |
| Overall Health | 4 |

EXAMPLE 7

| Over-Utilized Very Large Link | |
|---|---|
| Effective BW (mu): | 1.5018528125000006E7 |
| Data Rate (lambda): | 1.4518529011666672E7 |
| E[T] | 2.000003546672956E−6 |
| Delay Rating | 3.0 |
| Delay trend Rating | 5 |
| Delay Acceleration | 5 |
| Two Sigma | 3 |
| Overall Health | 4 |

From a review of these examples, one skilled in the art will appreciate that the results achieved from a practice of the present invention could be used for many purposes. For example, as discussed above, links on a user interface of a network planner can be color-coded according to an overall health score, in accordance with military operational standards, among other network planning possibilities.

Network health scores can be determined in a number of ways. For example, as discussed above, the analysis agent 180 may calculate an overall network health by averaging results determined by the analysis agent 180 for one or more links at a certain time, or over a period of time. In one embodiment, such an average is weighted. Of course, weighting may be based on a variety of factors and/or carried out in a plurality of ways. In one embodiment, the average is weighted based on a precedence of traffic associated with one or more links. Such precedence may be based on a timing of a message, an indicated urgency, sender, receiver, etc., as discussed in part above. The average may also be weighted based on a total number of links having one or more predetermined health scores and/or an amount of traffic. For example, a number of links having a score of 4, 5, or 6 may be determined to be a key characteristic of a particular network, and therefore relied upon. Similarly, an amount of traffic over links having a health score of 2, 3 or 4 may be sought to be maximized in a certain implementation. In that case, a system may consider only whether a score is 1) a 2, 3, or 4, or 2) is not a 2, 3, or 4, while disregarding any distinction within the class of scores 2, 3 and 4. In one embodiment, an amount of traffic using more than one (or another predetermined number) of links may be considered. One skilled in the art will appreciate that countless other possibilities exist as well, depending on a desired result, simplicity, etc.

It should be noted that, as discussed above, the methods disclosed herein in accordance with the invention need not include all disclosed steps or necessarily be practiced in a described order. For example, a capacity tool need not rely upon any or all of the four tests disclosed above, as one skilled in the art will readily appreciate that obvious variations may be made depending on a desired implementation. Similarly, disclosed systems are by way of example only and are therefore subject to much potential variation. In addition, it is contemplated that method steps and/or system elements disclosed in one example or embodiment may be combined with one or more other steps and/or elements in one or more other examples or embodiments, to achieve a system and/or method in accordance with the invention. For these and other reasons, the inventions disclosed should not be limited to embodiments presented herein, but rather are defined more generally, as by the appended claims.

What is claimed is:

1. A method for determining network health for a link in a communication network, comprising:
   receiving, at a capacity analysis system having a processor, a traffic demand record at time t1;
   receiving, at the capacity analysis system, a topology at time t1;
   determining a delay threshold of the link;
   determining a path over which traffic will be routed;
   determining an expected value of delay with respect to a utilization of the link;
   determining a rate of change of the expected value of delay;
   determining an acceleration of the expected value of delay;
   calculating an accumulated traffic for the link;
   calculating a maximum capacity of the link; and
   determining, with the capacity analysis system, a network health for the link based at least in part on the traffic demand record, the topology, the delay threshold, the path over which traffic will be routed, the expected value of delay with respect to the utilization of the link, the rate of change of the expected value of delay, the acceleration of the expected value of delay, the accumulated traffic for the link, and the maximum capacity of the link.

2. The method of claim 1, wherein the traffic demand record at t1 is received from a traffic lay down utility.

3. The method of claim 1, wherein the topology is received from a topology agent.

4. The method of claim 1, wherein the path over which traffic will be routed is determined based on the network health of the link at time t1.

5. The method of claim 4, wherein the path is a shortest communication path.

6. The method of claim 1, further comprising repeating the receiving the traffic demand record at time t1 when an additional traffic demand record exists for time t1.

7. The method of claim 1, wherein the network health for time t1 is provided to a planned network information repository.

8. The method of claim 1, further comprising:
reporting the network health to a topology agent; and
modifying the topology to achieve a modified topology based on the network health.

9. The method of claim 1, wherein the method is practiced for a predetermined plurality of times t1 to tn that together comprise a planned scenario, the method further comprising:
analyzing the network health for all times t1 to tn when the network health for all times t1 to tn have been received; and
generating a report for the planned scenario.

10. The method of claim 9, wherein generating the report for the planned scenario is performed by an analysis agent and wherein the report is provided to a planned network information repository.

11. A system for capacity analysis of a link and a plurality of remaining links in a wireless network, the system comprising:
a traffic lay-down utility that determines a traffic demand over the link at time t1;
a topology agent that outputs a network topology at time t1; and
an analysis agent that:
calculates an amount of accumulated traffic over the link;
calculates a link capacity for the link;
determines a delay threshold of the link;
determines a rate of change of an expected value of delay with respect to link utilization of the link;
determines an acceleration of the expected value of delay with respect to link utilization of the link;
determines a network health of the link at time t1 based at least in part on the amount of accumulated traffic over the link, the link capacity, the delay threshold, the rate of change of the expected value of delay with respect to a link utilization, and the acceleration of the expected value of delay with respect to the link utilization.

12. The system of claim 11, wherein the analysis agent determines a network health of each of the plurality of remaining links and to calculate an overall network health based on the network health of the link and the network health of each of the plurality of remaining links.

13. The system of claim 12, wherein the analysis agent calculates the overall network health by averaging the network health for the link and the network health for each of the plurality of remaining links.

14. The system of claim 13, wherein the analysis agent calculates the overall network health based on a weighted average of the network health for the link and the network health for each of the plurality of remaining links.

15. The system of claim 14, wherein the weighted average is weighted based on a precedence of traffic associated with the link and for each the plurality of remaining links of the network.

16. The system of claim 15, wherein the weighted averaged is weighted based on at least one of 1) a first total number of links having a first plurality of predetermined health scores, 2) an amount of traffic over a second total number of links having a second plurality of predetermined health scores, and 3) an amount of traffic using more than one of the link and the plurality of remaining links.

17. The system of claim 11, wherein the analysis agent assigns a health score to the link and each of the plurality of remaining links based on the network health of the link and each of the plurality of remaining links at time t1.

18. The system of claim 11, wherein the expected value of delay is defined as $E[T]=1/(\mu-\lambda)$, wherein $\mu$ is a packet service rate and $\lambda$ is a packet arrival rate.

\* \* \* \* \*